United States Patent
Rickis et al.

(10) Patent No.: US 10,077,747 B2
(45) Date of Patent: Sep. 18, 2018

(54) FUEL CONTROL SYSTEM

(71) Applicant: Hamilton Sundstrand Corporation, Charlotte, NC (US)

(72) Inventors: Aaron F. Rickis, Feeding Hills, MA (US); Elise N. Zimmerman, West Hartford, CT (US); Glenn Gradischer, Canton, CT (US); Francis P. Marocchini, Somers, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 223 days.

(21) Appl. No.: 14/993,476

(22) Filed: Jan. 12, 2016

(65) Prior Publication Data

US 2017/0198668 A1 Jul. 13, 2017

(51) Int. Cl.
| | | |
|---|---|---|
| F16K 17/04 | (2006.01) |
| F02M 37/00 | (2006.01) |
| F02M 63/00 | (2006.01) |
| F02C 7/232 | (2006.01) |
| F16K 27/02 | (2006.01) |

(52) U.S. Cl.
CPC ......... *F02M 37/0023* (2013.01); *F02C 7/232* (2013.01); *F02M 63/005* (2013.01); *F16K 17/042* (2013.01); *F16K 17/0406* (2013.01); *F16K 27/0209* (2013.01); *F16K 27/0245* (2013.01); *F02M 2200/8015* (2013.01)

(58) Field of Classification Search
CPC . F02M 37/0023; F02M 63/005; F16K 17/042
USPC .............. 137/528, 535, 511, 515, 899.2; 138/89–95, DIG. 8; 285/321
See application file for complete search history.

(56) References Cited

U.S. PATENT DOCUMENTS

| | | | | |
|---|---|---|---|---|
| 3,592,351 A | * | 7/1971 | Johnson, Jr. ......... | B65D 51/002 137/318 |
| 3,994,255 A | * | 11/1976 | Thompson .............. | F16K 31/60 116/277 |
| 4,132,239 A | * | 1/1979 | Bowen .................... | A47J 31/46 137/382 |
| 4,887,642 A | * | 12/1989 | Bernat ................ | F16K 11/0782 137/625.17 |
| 5,947,149 A | * | 9/1999 | Mark .................... | F16K 31/602 137/359 |
| 5,960,819 A | | 10/1999 | Weissinger et al. | |
| 6,102,303 A | * | 8/2000 | Bright .................. | F02M 51/005 137/341 |

(Continued)

FOREIGN PATENT DOCUMENTS

EP 2816268 A2 12/2014

OTHER PUBLICATIONS

Search Report issued on Jul. 3, 2017 in related GB Patent Application No. 1700461.5, 1 page.

*Primary Examiner* — Kevin Murphy
(74) *Attorney, Agent, or Firm* — Cantor Colburn LLP (57) ABSTRACT

A fuel control system includes a high pressure relief valve fluidly connected to a fuel pump outlet. The high pressure relief valve includes a closure and a nozzle. The closure has an opening and a locking notch defined by a circumferential wall. The nozzle has a base portion that is received within the opening and has a rim extending between a first surface and a second surface. The nozzle has a tab extending from the rim that is received within the locking notch.

18 Claims, 5 Drawing Sheets

(56) References Cited

U.S. PATENT DOCUMENTS

2002/0014267 A1  2/2002  Heald et al.
2014/0109983 A1* 4/2014  Rickis .................. F16K 15/025
                                                137/15.19
2014/0110618 A1  4/2014  Rick's et al.

* cited by examiner

FIG. 9

FUEL CONTROL SYSTEM

BACKGROUND OF THE INVENTION

The present invention relates to a fuel control system having a high pressure relief valve.

An aircraft engine includes a fuel control system provided with valves that regulate or limit fuel delivery to a combustion section of an engine. The valves regulate fuel that is supplied to the engine and also regulates fuel that is returned to a fuel supply. An example of such a control valve is a high pressure relief valve that permits fuel pressure to be relieved from a location downstream of a fuel pump and returned to a fuel pump inlet. Some high pressure relief valves experience high pressure loads, high impacts, and high-frequency oscillations during operation that decrease the service life of the high pressure relief valve.

SUMMARY OF THE INVENTION

According to an embodiment of the present invention, a fuel control system is provided. The fuel control system includes a high pressure relief valve fluidly connected to a fuel pump outlet. The high pressure relief valve includes a closure and a nozzle. The closure has an opening defined by a circumferential wall. The circumferential wall defines a locking notch. The nozzle has a base portion that is received within the opening and has a rim that extends between a first surface and a second surface. The nozzle has a tab that extends from the rim. The tab is received within the locking notch.

According to another embodiment of the present invention, a high pressure relief valve for a fuel control system is provided. The high pressure relief valve includes a closure, a nozzle, and a retainer ring. The closure has an opening defined by a circumferential wall that defines at least one locking notch disposed proximate a first end of the closure. The nozzle is at least partially received within the opening and includes a base portion and a nozzle body. The base portion is received within the opening and has a first surface, a second surface that defines a retaining groove, a rim that extends between the first surface and the second surface, and at least one tab that extends from the rim and is received within the at least one locking notch. The retainer ring has a retainer ring body received within the retaining groove and a locking tab.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely illustrative of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
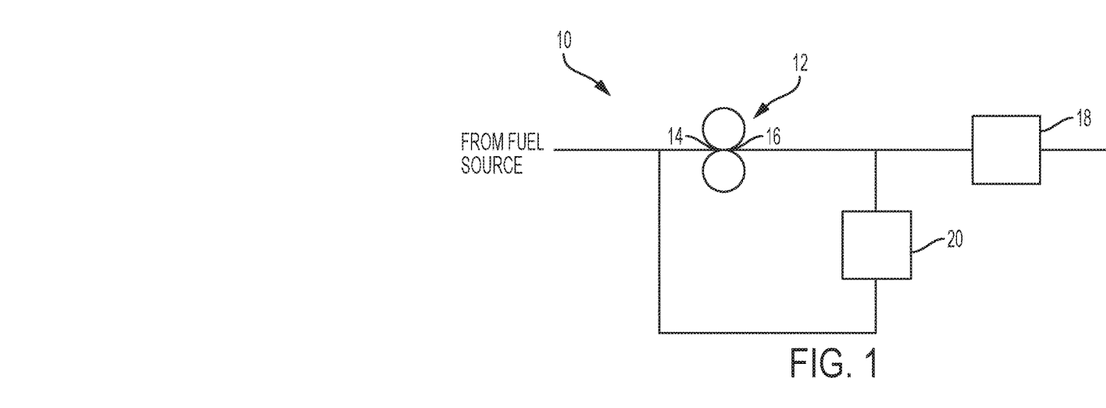
FIG. 1 is a schematic view of an aircraft fuel control system.

Referring to FIG. 1, an aircraft fuel control system 10 includes a fuel pump 12 having a fuel pump inlet 14 fluidly connected to a fuel source. The fuel pump 12 discharges pressurized fuel through a fuel pump outlet 16 to at least one of a metering valve 18 and a high pressure relief valve 20 that are in fluid communication with the fuel pump outlet 16. The metering valve 18 supplies the pressurized fuel to an engine such as a gas turbine engine.

During operation the high pressure relief valve 20 remains in a closed position. The fuel bypasses the high pressure relief valve 20 and passes through the metering valve 18 to the engine when the high pressure relief valve 20 is in the closed position. Should the aircraft fuel control system 10 provide fuel pressure greater than a threshold fuel pressure, the high pressure relief valve 20 at least partially opens to allow fuel to return to the fuel pump inlet 14 and/or the fuel source.

High pressure loads, high impacts, and high-frequency oscillations may result in a reduction in the service life of a component of the high pressure relief valve 20 when the high pressure relief valve 20 at least partially opens. Accordingly it is desirable to provide a more robust high pressure relief valve to provide a substantially uniform load distribution on the nozzle of the high pressure relief valve. The improved load distribution on the nozzle significantly reduces the stress as compared to previous high pressure relief valve designs. For example, the calculated cyclic stresses may be reduced by approximately 50% and the fatigue life may be improved as compared to the previous high pressure relief valve designs.

Figure 2:
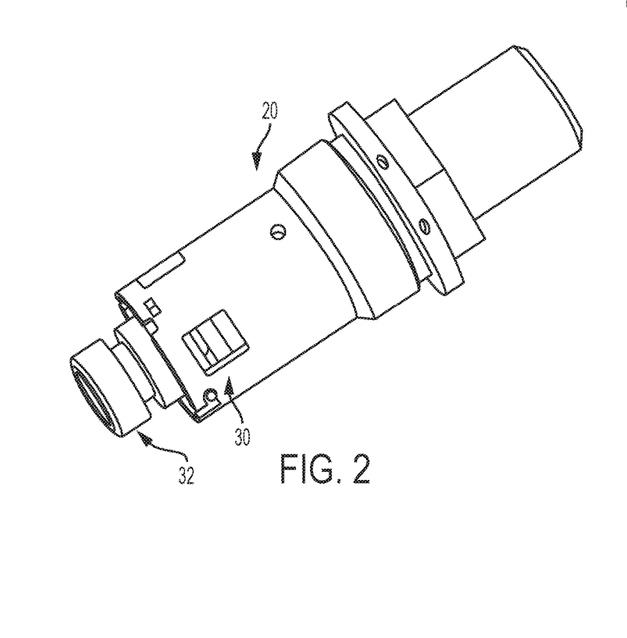
FIG. 2 is a perspective view of a high pressure relief valve of the aircraft fuel control system.
Figure 3:
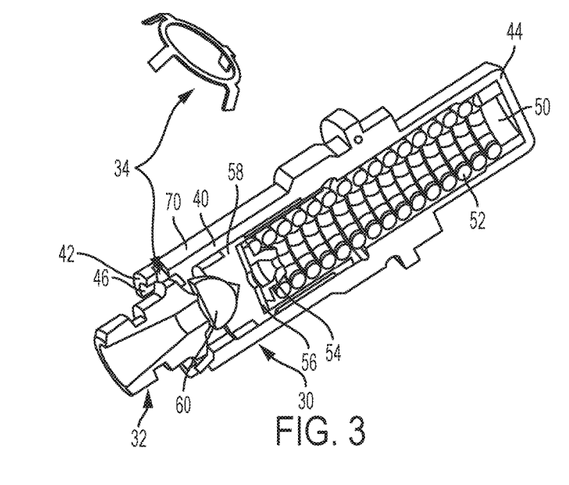
FIG. 3 is a partial cross sectional view of the high pressure relief valve.
Figure 4:
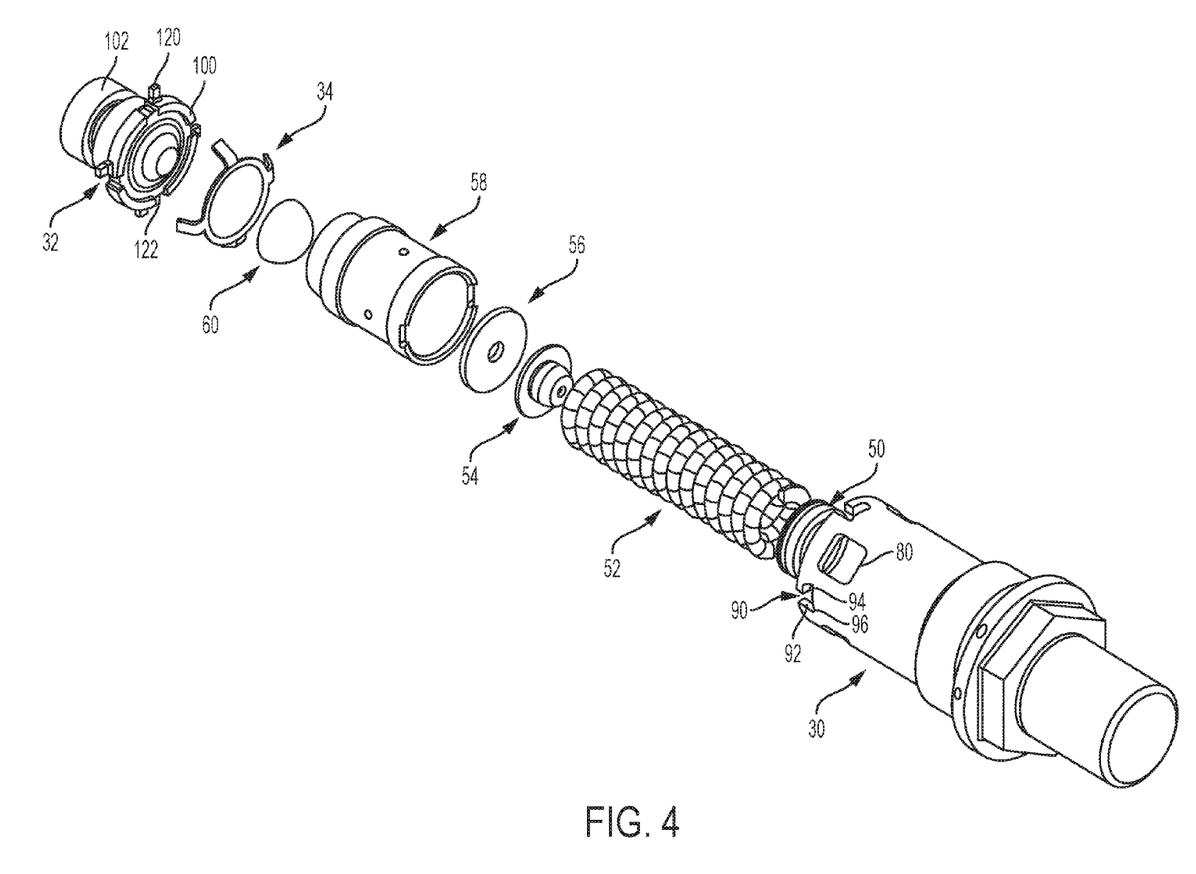
FIG. 4 is a disassembled view of the high pressure relief valve.
Figure 5:
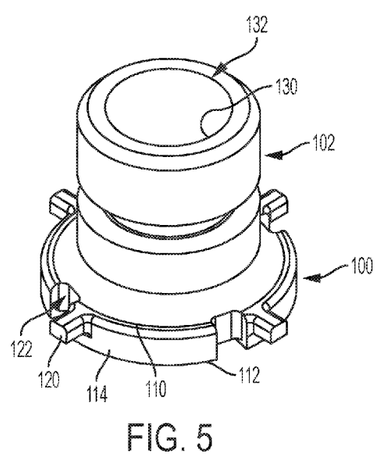
FIG. 5 is a partial top perspective view of the nozzle of the high pressure relief valve.
Figure 6:
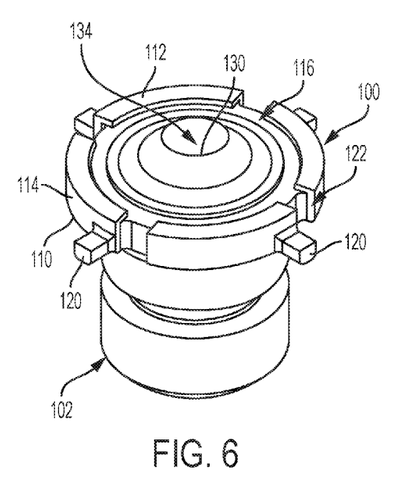
FIG. 6 is a partial bottom perspective view of a nozzle of the high pressure relief valve.

Referring to FIGS. 2-4, the high pressure relief valve 20 includes a closure 30, a nozzle 32, and a retaining ring 34. The closure 30 includes a circumferential wall 40 that extends from a first end 42 of the closure 30 towards a second end 44 of the closure 30. The circumferential wall 40 defines an opening 46 that extends from the first end 42 of the closure towards the second end 44 of the closure 30.

The opening 46 receives valve components that enable the nozzle 32 to move between a closed position and an open position. The valve components include shims 50, a biasing member 52, a spring seat 54, a seat shim 56, a valve spool 58, and a half ball 60. The shims 50 are disposed proximate the second end 44 of the closure 30. The biasing member 52 is configured as a spring. The biasing member 52 has a first biasing member end that engages the shims 50 and a second biasing member end that engages the spring seat 54. The biasing member 52 biases the nozzle 32 towards a closed position.

The spring seat 54 is disposed proximate the first end 42 of the closure. The seat shim 56 is disposed on top of the spring seat 54 and is disposed proximate the first end 42 of the closure 30. The valve spool 58 defines an opening that receives the seat shim 56, the spring seat 54, and at least a portion of the biasing member 52. The valve spool 58 is disposed proximate the first end 42 and extends towards the second end 44. The half ball 60 includes a substantially spherical or ball shaped portion that engages the top of the valve spool 58 and a substantially flat portion that engages an underside of the nozzle 32.

The circumferential wall 40 includes an outer surface 70 disposed opposite an inner surface. The inner surface includes a first inner surface portion 72, a second inner surface portion 74, and a shoulder surface 76. The first inner surface portion 72 engages at least a portion of the valve spool 58. The second inner surface portion 74 is spaced apart from and does not engage the valve spool 58. The second inner surface portion 74 is disposed proximate the first end 42 of the closure 30. The shoulder surface 76 extends from the first inner surface portion 72 towards the second inner surface portion 74. The shoulder surface 76 is disposed substantially perpendicular to the first inner surface portion 72 and is disposed substantially perpendicular to the second inner surface portion 74.

The circumferential wall 40 of the closure 30 defines at least one discharge window 80. The at least one discharge window 80 fluidly connects the high pressure relief valve 20 to the fuel pump inlet 14. The at least one discharge window 80 is disposed proximate the first end 42 of the closure 30. The at least one discharge window 80 extends from the outer surface 70 and through the inner surface. The at least one discharge window 80 extends from the outer surface 70 through at least a portion of the first inner surface portion 72, the second inner surface portion 74, and the shoulder surface 76. The at least one discharge window 80 has a generally rectangular shape having rounded corners. In at least one embodiment, the circumferential wall 40 of the closure defines four discharge windows that are spaced about from each other.

The circumferential wall 40 of the closure 30 defines at least one locking notch 90. The at least one locking notch 90 is disposed proximate the first end 42 of the closure 30. The at least one locking notch 90 is disposed proximate the at least one discharge window 80 and the shoulder surface 76. The at least one locking notch 90 includes a first locking notch portion 92 and a second locking notch portion 94.

The first locking notch portion 92 extends from the first end 42 of the closure 30 towards the second end 44 of the closure 30. The first locking notch portion 92 is configured as an axially extending slot that extends from the outer surface 70 of the circumferential wall 40 through the second inner surface portion 74. The second locking notch portion 94 extends substantially perpendicular to the first locking notch portion 92. The second locking notch portion 94 is configured as a radially extending slot that extends from the outer surface 70 of the circumferential wall 40 through the second inner surface portion 74.

A locking notch recess 96 is defined by the intersection of the first locking notch portion 92 and the second locking notch portion 94. In at least one embodiment, the locking notch recess 96 extends axially below the second locking notch portion 94.

In at least one embodiment, the at least one discharge window 80 and the at least one locking notch 90 are radially spaced apart from one another. In at least one embodiment, the at least one discharge window 80 and the at least one locking notch 90 are axially spaced apart from one another such that the at least one locking notch 90 is disposed closer to the first end 42 of the closure 30 than the at least one discharge window 80.

The nozzle 32 is at least partially received within the opening 46 defined by the circumferential wall 40 of the closure 30. Referring to FIGS. 5-9, the nozzle 32 includes a base portion 100 and a nozzle body 102.

The base portion 100 is at least partially received within the opening 46 defined by the circumferential wall 40 of the closure 30. The base portion 100 is disposed proximate the first end 42 of the closure 30.

The base portion 100 includes a first surface 110, a second surface 112, and a rim 114. The first surface 110 faces towards the first end 42 of the closure 30 when the base portion 100 is received within the opening 46 defined by the circumferential wall 40 of the closure 30. The second surface 112 is disposed opposite the first surface 110. The second surface 112 faces towards the second end 44 of the closure 30 when the base portion 100 is received within the opening 46 defined by the circumferential wall 40 of the closure 30. The second surface 112 engages the shoulder surface 76. The engagement of the second surface 112 with the shoulder surface 76 increases a contact area between the nozzle 32 and the closure 30. This increased contact area provides a substantially uniform distributed load of the nozzle 32 against the closure 30. For example, the nozzle 32 provides a uniform 360° distributed load. The increased contact area reduces the contact stresses between the nozzle 32 and the closure 30 to improve the service life of the high pressure relief valve 20.

The second surface 112 defines a retaining groove 116. The retaining groove 116 is sized to receive at least a portion of the retaining ring 34. The retaining groove 116 extends from the second surface 112 towards the first surface 110. The retaining groove 116 is radially spaced apart from the rim 114. The retaining groove 116 is disposed closer to a center of the nozzle 32 than the rim 114.

The rim 114 extends between the first surface 110 and the second surface 112. The rim 114 engages the second inner surface portion 74. The rim 114 includes at least one tab 120. The at least one tab 120 extends radially from the rim 114. The at least one tab 120 is disposed substantially parallel to the first surface 110 and the second surface 112. The at least one tab 120 is configured to be received within at least one of the first locking notch portion 92 and the second locking notch portion 94 of the at least one locking notch 90 to retain the nozzle 32 within the closure 30.

The base portion 100 defines at least one relief groove 122. The at least one relief groove 122 is disposed adjacent to the at least one tab 120. The at least one relief groove 122 extends from the rim 114 through the first surface 110 and the second surface 112 of the base portion 100 towards the center of the nozzle 32.

The nozzle body 102 extends away from the base portion 100. The nozzle body 102 extends beyond the first end 42 of the closure 30. The nozzle body 102 defines a groove configured to receive an O-ring. The nozzle body 102 includes a nozzle bore 130 that extends from a nozzle inlet 132 to a nozzle outlet 134. The nozzle bore 130, the nozzle inlet 132, and the nozzle outlet 134 fluidly connects the fuel pump outlet 16 to the at least one discharge window 80 when the high pressure relief valve 20 moves from the closed position towards the open position.

Figure 7:
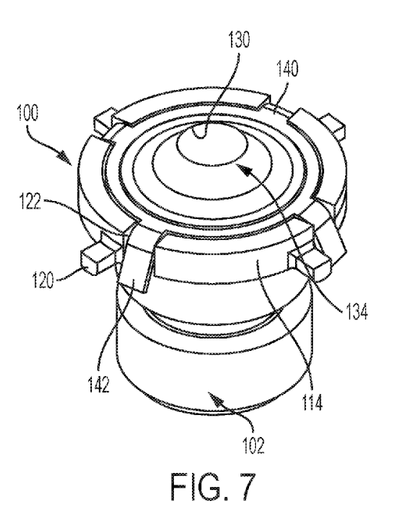
FIG. 7 is a partial bottom perspective view of the nozzle including a retaining ring of the high pressure relief valve.

The retaining ring 34 is received within the retaining groove 116 of the second surface 112 of the base portion 100 of the nozzle 32 and is at least partially received within the at least one relief groove 122 of the base portion 100 of the nozzle 32. In at least one embodiment, the retaining ring 34 is disposed on the second surface 112 of the base portion 100 of the nozzle 32. The retaining ring 34 includes a retaining ring body 140 and at least one locking tab 142.

The retaining ring body 140 is configured as an annular ring. The retaining ring body 140 is received within the retaining groove 116. The at least one locking tab 142 extends from the retaining ring body 140. The at least one locking tab 142 is configured to be at least partially received within the at least one relief groove 122.

Referring to FIGS. 8A-8D, the installation process of the nozzle 32 and the retaining ring 34 into the closure 30 of the high pressure relief valve 20 is illustrated. The retaining ring body 140 of the retaining ring 34 is disposed within the retaining groove 116 of the second surface 112 of the nozzle 32. The at least one locking tab 142 of the retaining ring 34 is at least partially received within the at least one relief groove 122. The at least one tab 120 of the nozzle 32 is positioned relative to the first locking notch portion 92 of the at least one locking notch 90 of the circumferential wall 40 of the closure 30.

Figure 8A:
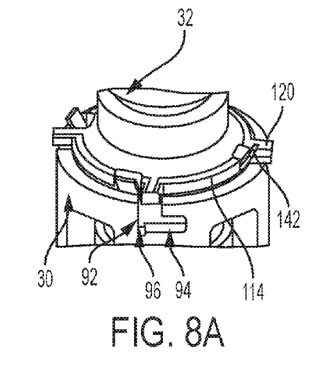
FIGS. 8A-8D are perspective views of the installation of the nozzle into the closure of the high pressure relief valve.

The at least one tab 120 of the nozzle 32 is received within the first locking notch portion 92 of the at least one locking notch 90 such that the combination of the nozzle 32 and the retaining ring 34 are inserted into the opening 46 defined by the circumferential wall 40 of the closure 30, as shown in FIG. 8A. The at least one locking tab 142 is bent towards or is received further within the at least one relief groove 122 by an edge of the circumferential wall 40 of the closure 30 as the nozzle 32 and the retaining ring 34 are inserted into the opening 46 defined by the circumferential wall 40 of the closure 30.

Figure 8B:
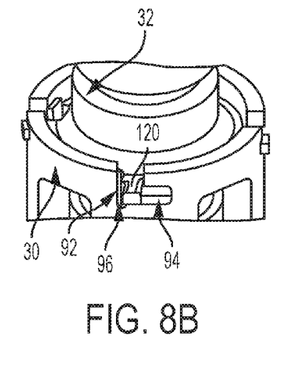

The engagement of the second surface 112 of the base portion 100 of the nozzle 32 acts as a stop to inhibit further axial movement of the nozzle 32 and the retaining ring 34 towards the second end 44 of the closure 30. The at least one tab 120 is received within the locking notch recess 96, as shown in FIG. 8B.

Figure 8C:
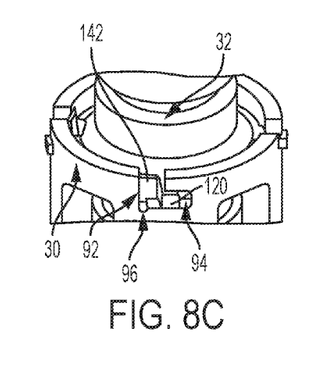
Figure 8D:
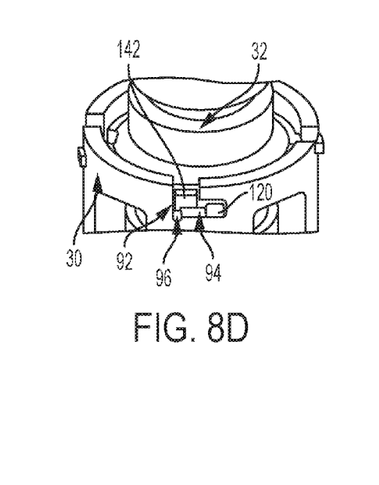

The nozzle 32 and the retaining ring 34 are rotated such that the at least one tab 120 translates from the locking notch recess 96 towards an end of the second locking notch portion 94, as shown in FIG. 8C. The engagement of the at least one tab 120 with the end of the second locking notch portion 94 seats the nozzle 32 within the opening 46 defined by the circumferential wall 40 of the closure 30. As well, the at least one locking tab 142 extends through at least one of the first locking notch portion 92 and the second locking notch portion 94, as shown in FIG. 8D. The at least one locking tab 142 inhibits the nozzle 32 from rotating out of the at least one locking notch 90.

Figure 9:
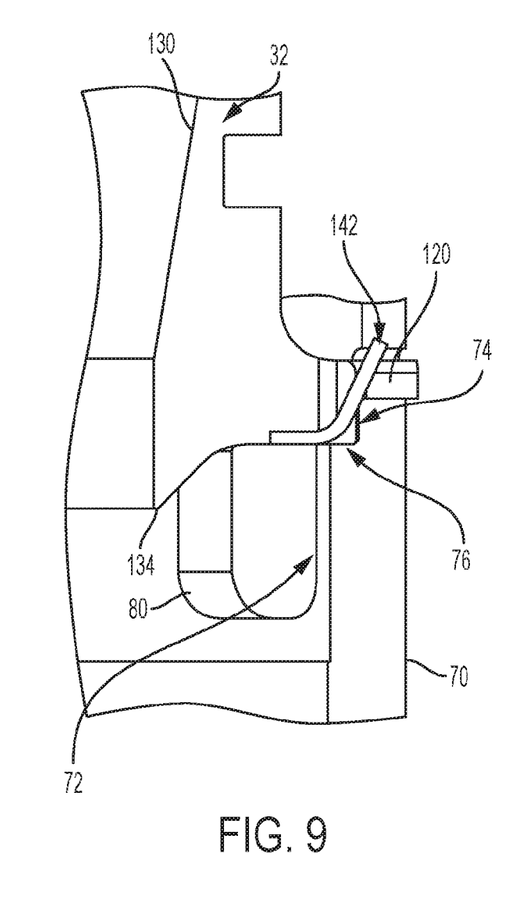
FIG. 9 is a partial cross-sectional view of the nozzle and a closure of the high pressure relief valve.

As shown in FIG. 9, when the nozzle 32 and the retaining ring 34 are seated within the opening 46 defined by the circumferential wall 40 of the closure 30, the at least one locking tab 142 engages the second inner surface portion 74 of the circumferential wall 40. The at least one locking tab 142 retains the nozzle 32 and the retaining ring 34 within the opening 46 defined by the circumferential wall 40 of the closure 30. The at least one tab 120 is subjected mainly to the preload of the biasing member 52 and the locking tab 142 prevents disengagement of the tab 120. During operation the nozzle 32 is loaded against the closure 30 and the shoulder surface 76 to significantly reduce operational loads.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A fuel control system comprising:
a high pressure relief valve fluidly connected to a fuel pump outlet, the high pressure relief valve including:
a closure having an opening defined by a circumferential wall, the circumferential wall having an inner surface that includes a first inner surface, a second inner surface, and a shoulder surface extending between the first inner surface and the second inner surface and an outer surface disposed opposite the inner surface, the circumferential wall defining a locking notch; and
a nozzle having a base portion that is received within the opening, the base portion having a rim extending between a first surface and a second surface, and a tab extending from the rim, the second surface engages the shoulder surface and the tab is received within the locking notch.

2. The fuel control system of claim 1, wherein the shoulder surface is disposed proximate the locking notch.

3. The fuel control system of claim 1, wherein the rim is configured to engage the second inner surface.

4. The fuel control system of claim 1, wherein the circumferential wall defines a discharge window disposed proximate the locking notch and extends through the first inner surface, the second inner surface, and the shoulder surface, the discharge window fluidly connects the high pressure relief valve to a fuel pump inlet.

5. The fuel control system of claim 1, wherein the high pressure relief valve further includes a retaining ring disposed on the second surface, the retaining ring having a retaining ring body and a locking tab extending from the retaining ring body.

6. The fuel control system of claim 5, wherein the base portion defines a relief groove disposed adjacent to the tab, the relief groove configured to receive the locking tab.

7. The fuel control system of claim 5, wherein the locking notch includes a first locking notch portion and a second locking notch portion.

8. The fuel control system of claim 7, wherein the tab is configured to be received within the second locking notch portion.

9. The fuel control system of claim 7, wherein the locking tab is received within the first locking notch portion.

10. A high pressure relief valve for an aircraft fuel control system, the high pressure relief valve comprising:
a closure having an opening defined by a circumferential wall, the circumferential wall defining at least one locking notch disposed proximate a first end of the closure;
a nozzle at least partially received within the opening, the nozzle including:

a base portion that is received within the opening, the base portion having a first surface, a second surface defining a retaining groove that extends from the second surface towards the first surface, a rim extending between the first surface and the second surface and spaced apart from the retaining groove, and at least one tab extending from the rim that is received within the at least one locking notch; and a retainer ring having a retainer ring body received within the retaining groove and a locking tab.

11. The high pressure relief valve of claim 10, wherein the base portion defines at least one relief groove disposed proximate the at least one tab.

12. The high pressure relief valve of claim 11, wherein the at least one locking tab is received within the at least one relief groove.

13. The high pressure relief valve of claim 10, wherein the at least one locking notch includes a first locking portion extending from the first end of the closure towards a second end of the closure and a second locking portion extending substantially perpendicular to the first locking portion.

14. The high pressure relief valve of claim 13, wherein the at least one locking tab is received within the second locking portion.

15. The high pressure relief valve of claim 13, wherein the at least one tab is received within the first locking portion.

16. The high pressure relief valve of claim 10 wherein the circumferential wall includes a first inner surface, a second inner surface, and a shoulder surface extending from the first inner surface to the second inner surface.

17. The high pressure relief valve of claim 16, wherein the second surface is configured to engage the shoulder surface and the rim is configured to engage the second inner surface.

18. The high pressure relief valve of claim 17, wherein the at least one locking tab engages the second inner surface.

* * * * *